United States Patent
Stephens et al.

(10) Patent No.: US 6,893,252 B2
(45) Date of Patent: May 17, 2005

(54) FUEL SPUD FOR HIGH TEMPERATURE BURNERS

(75) Inventors: George Stephens, Humble, TX (US); David B. Spicer, Houston, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 0 days.

(21) Appl. No.: 10/389,328

(22) Filed: Mar. 14, 2003

(65) Prior Publication Data

US 2003/0175642 A1 Sep. 18, 2003

Related U.S. Application Data

(60) Provisional application No. 60/365,235, filed on Mar. 16, 2002.

(51) Int. Cl.[7] .................................................. F23M 3/00
(52) U.S. Cl. ............................................... 431/9; 431/5
(58) Field of Search ............................... 431/9, 5, 115, 431/215; 126/91 A

(56) References Cited

U.S. PATENT DOCUMENTS

| | | |
|---|---|---|
| 2,368,370 A | 1/1945 | Maxon |
| 2,813,578 A | 11/1957 | Ferguson |
| 2,918,117 A | 12/1959 | Griffin |
| 2,983,312 A | 5/1961 | Finley et al. |
| 3,880,570 A | 4/1975 | Marshall |
| 4,004,875 A | 1/1977 | Zink et al. |
| 4,089,629 A | 5/1978 | Baumgartner et al. |
| 4,130,388 A | 12/1978 | Flanagan |
| 4,230,445 A | 10/1980 | Janssen |
| 4,257,763 A | 3/1981 | Reed |
| 4,575,332 A | 3/1986 | Oppenberg et al. |
| 4,629,413 A | 12/1986 | Michelson et al. |
| 4,708,638 A | 11/1987 | Brazier et al. |
| 4,739,713 A | 4/1988 | Vier et al. |
| 4,748,919 A | 6/1988 | Campobenedetto et al. |
| 4,815,966 A | 3/1989 | Janssen |

(Continued)

FOREIGN PATENT DOCUMENTS

| | | |
|---|---|---|
| CA | 1169753 | 6/1984 |
| DE | 2944153 | 5/1981 |
| DE | 3232421 | 3/1984 |

(Continued)

OTHER PUBLICATIONS

Abstract of EP 0 507 233 published on Oct. 7, 1992, entitled "Burner for Liquid Fuels".

(Continued)

Primary Examiner—Alfred Basichas
(74) Attorney, Agent, or Firm—Lucinda Lomas; Linda A. Kubena

(57) ABSTRACT

An improved burner and a method for combusting fuel in a burner used in furnaces such as those found in steam cracking. The burner includes a burner tube having a downstream end and an upstream end, the burner tube having a venturi therein; a fuel spud located adjacent the upstream end of the burner tube, for introducing fuel gas into the burner tube; a burner tip mounted on the downstream end of the burner tube adjacent a first opening in the furnace; at least one passageway having a first end and a second end adjacent the upstream end of the burner tube; means for drawing flue gas from the furnace, through the passageway, in response to an inspirating effect of uncombusted fuel gas exiting the fuel spud, the uncombusted fuel gas flowing through the burner tube from its upstream end towards its downstream end; and means for increasing the inspirating effect of uncombusted fuel gas exiting the fuel spud. The means for increasing the inspirating effect of uncombusted fuel gas exiting the fuel spud is effective to increase the amount of flue gas drawn from the furnace.

34 Claims, 14 Drawing Sheets

U.S. PATENT DOCUMENTS

| | | |
|---|---|---|
| 4,828,483 A | 5/1989 | Finke |
| 4,963,089 A | 10/1990 | Spielman |
| 4,995,807 A | 2/1991 | Rampley et al. |
| 5,044,931 A | 9/1991 | Van Eerden et al. |
| 5,073,105 A | 12/1991 | Martin et al. |
| 5,092,761 A | 3/1992 | Dinicolantonio |
| 5,098,282 A | 3/1992 | Schwartz et al. |
| 5,135,387 A | 8/1992 | Martin et al. |
| 5,152,463 A | 10/1992 | Mao et al. |
| 5,154,596 A | 10/1992 | Schwartz et al. |
| 5,195,884 A | 3/1993 | Schwartz et al. |
| 5,201,650 A | 4/1993 | Johnson |
| 5,224,851 A | 7/1993 | Johnson |
| 5,238,395 A | 8/1993 | Schwartz et al. |
| 5,254,325 A * | 10/1993 | Yamasaki et al. ............ 423/450 |
| 5,263,849 A | 11/1993 | Irwin et al. |
| 5,269,679 A | 12/1993 | Syska et al. |
| 5,275,554 A | 1/1994 | Faulkner |
| 5,284,438 A | 2/1994 | McGill et al. |
| 5,299,930 A | 4/1994 | Weidman |
| 5,316,469 A | 5/1994 | Martin et al. |
| 5,326,254 A | 7/1994 | Munk |
| 5,344,307 A | 9/1994 | Schwartz et al. |
| 5,350,293 A | 9/1994 | Khinkis et al. |
| 5,370,526 A * | 12/1994 | Buschulte et al. ........... 431/116 |
| 5,407,345 A | 4/1995 | Robertson et al. |
| 5,413,477 A | 5/1995 | Moreland |
| 5,470,224 A | 11/1995 | Bortz |
| 5,472,341 A | 12/1995 | Meeks |
| 5,542,839 A | 8/1996 | Kelly |
| 5,562,438 A | 10/1996 | Gordon et al. |
| 5,584,684 A | 12/1996 | Dobbeling et al. |
| 5,603,906 A | 2/1997 | Lang et al. |
| 5,611,682 A | 3/1997 | Slavejkov et al. |
| 5,624,253 A | 4/1997 | Sulzhik et al. |
| 5,685,707 A | 11/1997 | Ramsdell et al. |
| 5,688,115 A * | 11/1997 | Johnson ......................... 431/9 |
| 5,807,094 A | 9/1998 | Sarv |
| 5,813,846 A * | 9/1998 | Newby et al. ................. 431/9 |
| 5,980,243 A | 11/1999 | Surbey et al. |
| 5,984,665 A | 11/1999 | Loftus et al. |
| 5,987,875 A | 11/1999 | Hilburn et al. |
| 5,993,193 A | 11/1999 | Loftus et al. |
| 6,007,325 A | 12/1999 | Loftus et al. |
| 6,056,538 A | 5/2000 | Büchner et al. |
| 6,332,408 B2 | 12/2001 | Howlett et al. |
| 6,347,935 B1 | 2/2002 | Schindler et al. |
| 6,383,462 B1 * | 5/2002 | Lang ......................... 423/235 |
| 6,616,442 B2 | 9/2003 | Venizelos et al. |

FOREIGN PATENT DOCUMENTS

| | | |
|---|---|---|
| DE | 3818265 | 11/1989 |
| EP | 0099828 | 6/1988 |
| EP | 0 347 956 | 12/1989 |
| EP | 0 374 423 | 6/1990 |
| EP | 0 408 171 A1 | 1/1991 |
| EP | 0 507 233 | 10/1992 |
| EP | 0 620 402 A1 | 10/1994 |
| EP | 0 674 135 B2 | 9/1995 |
| EP | 0 751 343 | 1/1997 |
| EP | 0486169 | 1/1998 |
| EP | 1096202 | 2/2001 |
| EP | 1 211 458 | 6/2002 |
| FR | 2529900 | 10/1988 |
| SU | 374488 | 5/1970 |

OTHER PUBLICATIONS

Chemical Engineering Progress, vol. 43, 1947, "The Design of Jet Pumps" by Edgar Kroll, pp. 21–24, vol. 1, No. 2.

Straitz III, John F., et al., "Combat NOx With Better Burner Design," *Chemical Engineering*, Nov. 1994, pp. EE–4–EE–8.

Vahdati, M. M., et al., "Design And Development of A Low NOx Coanda Ejector Burner," *Journal of the Institute of Energy*, Mar. 2000, vol. 73, pp. 12–17.

Bussman, Wes, et al., "Low NOx Burner Technology for Ethylene Cracking Furnaces," presented at the *2001 AIChE Spring National Meeting, 13th Annual Ethylene Producers Conference*, Houston, TX, Apr. 25, 2001, pp. 1–23.

Seebold, James G., "Reduce Heater NOx in the Burner," *Hydrocarbon Processing*, Nov. 1982, pp. 183–186.

"West Germany's Caloric Develops a Low–NOx Recycling Fuel Burner," *Chemical Engineering*, Oct. 4, 1982, p. 17.

* cited by examiner

FUEL SPUD FOR HIGH TEMPERATURE BURNERS

RELATED APPLICATIONS

This patent application claims priority from Provisional Application Ser. No. 60/365,235, filed on Mar. 16, 2002, the contents of which are hereby incorporated by reference.

FIELD OF THE INVENTION

This invention relates to an improvement in a burner of the type employed in high temperature industrial furnaces. More particularly, it relates to an improved burner fuel spud design capable of achieving a reduction in $NO_x$ emissions through increased inspirating efficiency.

BACKGROUND OF THE INVENTION

As a result of the interest in recent years to reduce the emission of pollutants from burners of the type used in large industrial furnaces, significant improvements have been made in burner design. In the past, burner design improvements were aimed primarily at improving heat distribution. Increasingly stringent environmental regulations have shifted the focus of burner design to the minimization of regulated pollutants.

Oxides of nitrogen ($NO_x$) are formed in air at high temperatures. These compounds include, but are not limited to, nitrogen oxide and nitrogen dioxide. Reduction of NO, emissions is a desired goal to decrease air pollution and meet government regulations.

The rate at which $NO_x$ is formed is dependent upon the following variables: (1) flame temperature, (2) residence time of the combustion gases in the high temperature zone and (3) excess oxygen supply. The rate of formation of $NO_x$ increases as flame temperature increases. However, the reaction takes time and a mixture of nitrogen and oxygen at a given temperature for a very short time may produce less $NO_x$ than the same mixture at a lower temperature, over a longer period of time.

A strategy for achieving lower $NO_x$ emission levels is to install a $NO_x$ reduction catalyst to treat the furnace exhaust stream. This strategy, known as Selective Catalytic Reduction (SCR), is very costly and, although it can be effective in meeting more stringent regulations, represents a less desirable alternative to improvements in burner design.

Burners used in large industrial furnaces may use either liquid fuel or gas. Liquid fuel burners mix the fuel with steam prior to combustion to atomize the fuel to enable more complete combustion, and combustion air is mixed with the fuel at the zone of combustion.

Gas fired burners can be classified as either premix or raw gas, depending on the method used to combine the air and fuel. They also differ in configuration and the type of burner tip used.

Raw gas burners inject fuel directly into the air stream, and the mixing of fuel and air occurs simultaneously with combustion. Since airflow does not change appreciably with fuel flow, the air register settings of natural draft burners must be changed after firing rate changes. Therefore, frequent adjustment may be necessary, as explained in detail in U.S. Pat. No. 4,257,763. In addition, many raw gas burners produce luminous flames.

Premix burners mix some or all of the fuel with some or all of the combustion air prior to combustion. Since premixing is accomplished by using the energy present in the fuel stream, airflow is largely proportional to fuel flow. As a result, therefore, less frequent adjustment is required. Premixing the fuel and air also facilitates the achievement of the desired flame characteristics. Due to these properties, premix burners are often compatible with various steam cracking furnace configurations.

Floor-fired premix burners are used in many steam crackers and steam reformers primarily because of their ability to produce a relatively uniform heat distribution profile in the tall radiant sections of these furnaces. Flames are non-luminous, permitting tube metal temperatures to be readily monitored. Therefore, a premix burner is the burner of choice for such furnaces. Premix burners can also be designed for special heat distribution profiles or flame shapes required in other types of furnaces.

One technique for reducing $NO_x$ that has become widely accepted in industry is known as combustion staging. With combustion staging, the primary flame zone is deficient in either air (fuel-rich) or fuel (fuel-lean). The balance of the air or fuel is injected into the burner in a secondary flame zone or elsewhere in the combustion chamber. As is well known, a fuel-rich or fuel-lean combustion zone is less conducive to $NO_x$ formation than an air-fuel ratio closer to stoichiometry. Combustion staging results in reducing peak temperatures in the primary flame zone and has been found to alter combustion speed in a way that reduces $NO_x$. Since $NO_x$ formation is exponentially dependent on gas temperature, even small reductions in peak flame temperature dramatically reduce $NO_x$ emissions. However this must be balanced with the fact that radiant heat transfer decreases with reduced flame temperature, while carbon monoxide (CO) emissions, an indication of incomplete combustion, may actually increase as well.

The majority of recent low $NO_x$ burners for gas-fired industrial furnaces is based on the use of multiple fuel jets in a single burner. Such burners may employ fuel staging, flue-gas recirculation, or a combination of both. U.S. Pat. Nos. 5,098,282 and 6,007,325 disclose burners using a combination of fuel-staging and flue-gas recirculation. Certain burners may have as many as 8–12 fuel nozzles in a single burner. The large number of fuel nozzles requires the use of very small diameter nozzles. In addition, the fuel nozzles of such burners are generally exposed to the high temperature flue-gas in the firebox.

In the high temperature environment of steam-cracking furnaces used for the manufacture of ethylene, the combination of small diameter fuel nozzles and exposure to high temperature flue gas can lead to fouling and potential plugging of the fuel jets. This not only has an adverse impact on burner performance, but also increases the cost of maintenance associated with repeated cleaning of fuel nozzles.

In the context of premix burners, the term primary air refers to the air premixed with the fuel; secondary, and in some cases tertiary, air refers to the balance of the air required for proper combustion. In raw gas burners, primary air is the air that is more closely associated with the fuel; secondary and tertiary air are more remotely associated with the fuel. The upper limit of flammability refers to the mixture containing the maximum fuel concentration (fuel-rich) through which a flame can propagate.

U.S. Pat. No. 4,629,413 discloses a low $NO_x$ premix burner and discusses the advantages of premix burners and methods to reduce $NO_x$ emissions. The premix burner of U.S. Pat. No. 4,629,413 lowers $NO_x$ emissions by delaying the mixing of secondary air with the flame and allowing some cooled flue gas to recirculate with the secondary air.

The contents of U.S. Pat. No. 4,629,413 are incorporated by reference in their entirety.

U.S. Pat. No. 5,092,761 discloses a method and apparatus for reducing $NO_x$ emissions from premix burners by recirculating flue gas. Flue gas is drawn from the furnace through a pipe or pipes by the inspirating effect of fuel gas and combustion air passing through a venturi portion of a burner tube. The flue gas mixes with combustion air in a primary air chamber prior to combustion to dilute the concentration of $O_2$ in the combustion air, which lowers flame temperature and thereby reduces $NO_x$ emissions. The flue gas recirculating system may be retrofitted into existing premix burners or may be incorporated in new low $NO_x$ burners. The contents of U.S. Pat. No. 5,092,761 are incorporated by reference in their entirety.

An advantage of the staged-air pre-mix burners disclosed in U.S. Pat. Nos. 4,629,413 and 5,092,761 relates to their use of a single fuel nozzle. This permits the size of the fuel nozzle to be the maximum possible for a given burner firing duty. In addition, since the fuel nozzle is located at the inlet to the venturi, it is not exposed directly to either the high temperature flue-gas or the radiant heat of the firebox. For these reasons the problems of fuel nozzle fouling are minimized, providing a significant advantage for the staged-air pre-mix burner in ethylene furnace service.

An additional challenge to the designer of industrial burners is to find techniques for meeting the increasingly stringent emission standards for $NO_x$. Flue gas recirculation has proven to be a viable means for reducing $NO_x$ emissions. Burners of the type disclosed in U.S. Pat. No. 5,092,761, while effective in reducing $NO_x$ emissions over other designs, have generally exhibited an inability to increase levels of flue gas recirculation beyond ten percent, limiting their ability to achieve further reductions in $NO_x$ emissions.

Despite these advances in the art, a need exists for a highly efficient burner design for industrial use to meet increasingly stringent $NO_x$ emission regulations, which permits levels of flue gas recirculation above ten percent.

Therefore, what is needed is a burner for the combustion of fuel and air wherein higher rates of flue gas recirculation can be achieved, enabling further reductions in $NO_x$ emissions.

SUMMARY OF THE INVENTION

The present invention is directed to an improved low $NO_x$ burner and to a method for reducing $NO_x$ emissions from burners used in furnaces such as those found in steam cracking. The burner includes a burner tube having a downstream end and having an upstream end, the burner tube having a venturi therein; a fuel spud located adjacent the upstream end of the burner tube, for introducing fuel gas into the burner tube; a burner tip mounted on the downstream end of the burner tube adjacent a first opening in the furnace; at least one passageway having a first end and a second end adjacent the upstream end of the burner tube; means for drawing flue gas from the furnace, through the passageway, in response to an inspirating effect of uncombusted fuel gas exiting the fuel spud, the uncombusted fuel gas flowing through the burner tube from its upstream end towards its downstream end; and means for increasing the inspirating effect of uncombusted fuel gas exiting the fuel spud. The means for increasing the inspirating effect of uncombusted fuel gas exiting the fuel spud is effective to increase the amount of flue gas drawn from the furnace prior to the zone of combustion over a burner without the means for increasing the inspirating effect, resulting in lower $NO_x$ emissions during combustion over a similar burner utilizing a conventional fuel spud design.

The method of the present invention includes the steps of combining fuel gas, air or mixtures thereof at a predetermined location adjacent a fuel spud; discharging the fuel gas, air or mixtures thereof at a burner tip downstream of the predetermined location, the burner tip surrounded by a peripheral tile; drawing a stream of flue gas from the furnace in response to the inspirating effect of uncombusted fuel gas exiting the fuel spud and flowing towards the combustion zone, the flue gas mixing with fuel or fuel and air at the predetermined location upstream of the zone of combustion; increasing the inspirating effect of uncombusted fuel gas exiting the fuel spud; and combusting the fuel gas downstream of the burner tip downstream of the predetermined location, wherein the inspirating increasing step is effective to increase the amount of flue gas drawn from the furnace.

An object of the present invention is to provide a burner configuration wherein higher levels of flue gas recirculation may be achieved, yielding further reductions in $NO_x$ emissions.

A further object of the present invention is to optimize the gas exit velocity of the fuel spud to increase the inspiration efficiency of the fuel spud/burner tube venturi combination.

A yet further object is to provide a fuel gas control system capable of maximizing the benefits resulting from the use of a converging/diverging nozzle fuel spud.

These and other objects and features of the present invention will be apparent from the detailed description taken with reference to accompanying drawings.

BRIEF DESCRIPTION OF THE DRAWINGS

The invention is further explained in the description that follows with reference to the drawings illustrating, by way of non-limiting examples, various embodiments of the invention wherein.

DETAILED DESCRIPTION OF THE ILLUSTRATED EMBODIMENTS

Figure 1:
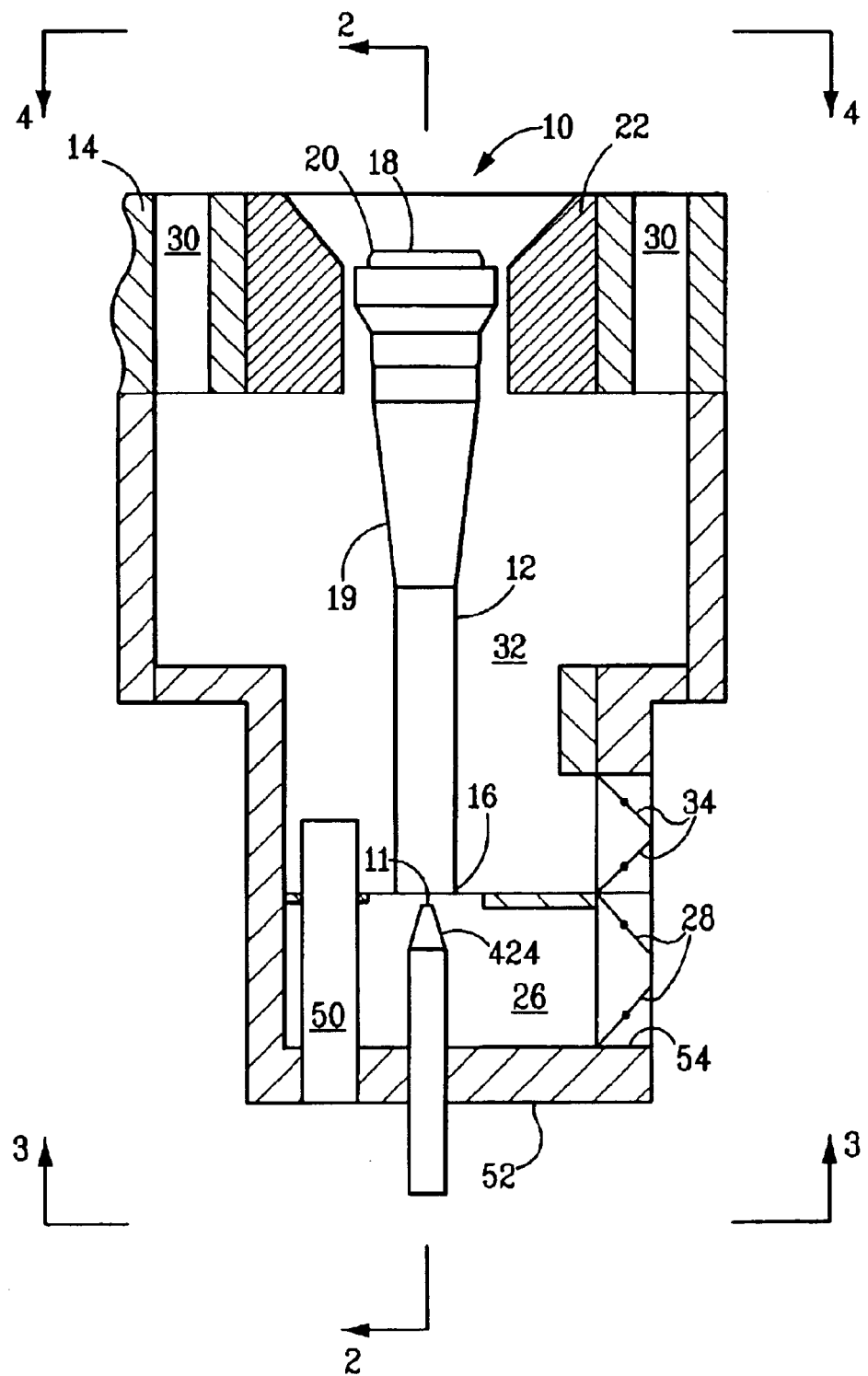
FIG. 1 illustrates an elevation partly in section of an embodiment of the burner of the present invention.
Figure 2:
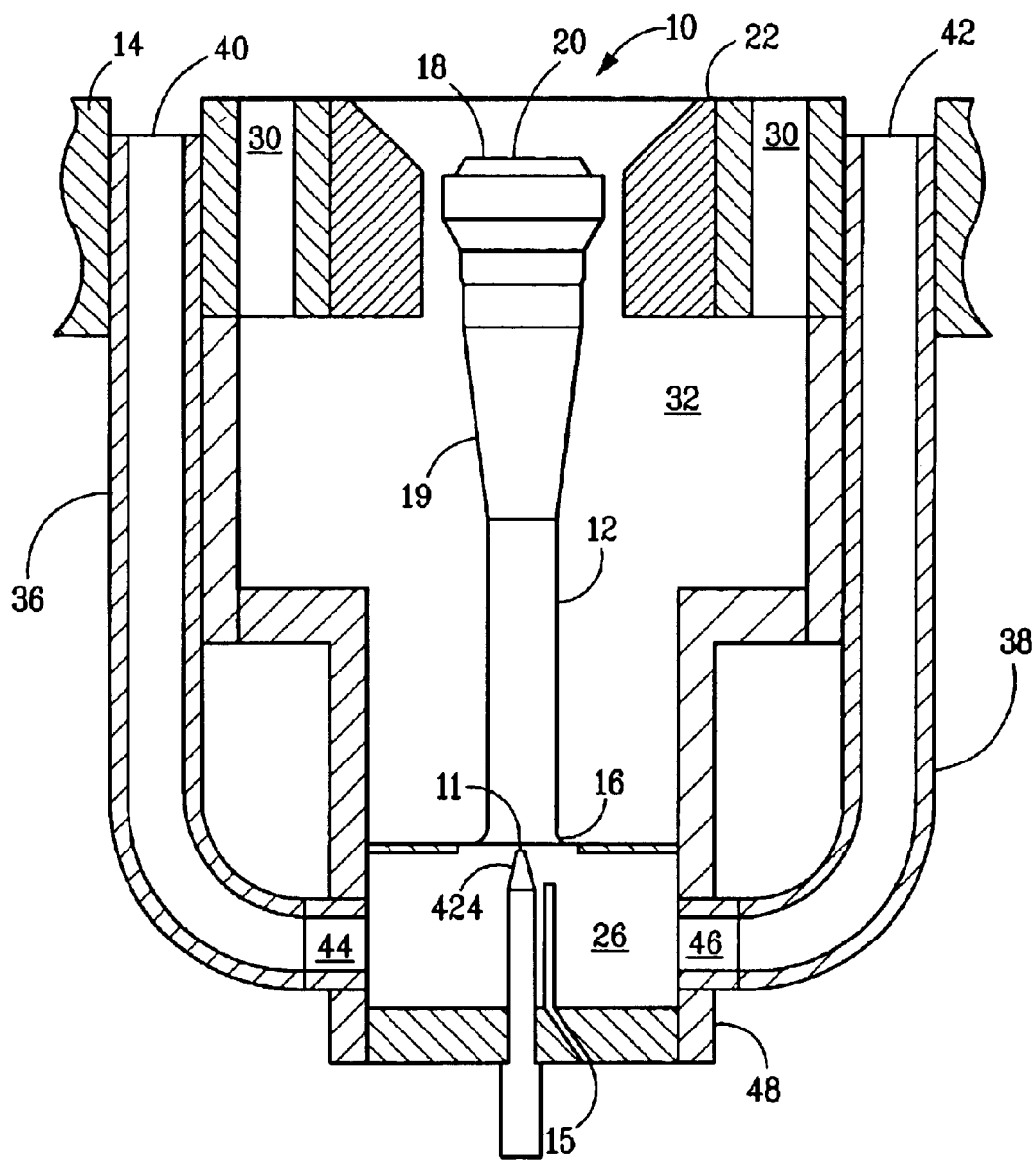
FIG. 2 is an elevation partly in section taken along line 2—2 of FIG. 1.
Figure 3:
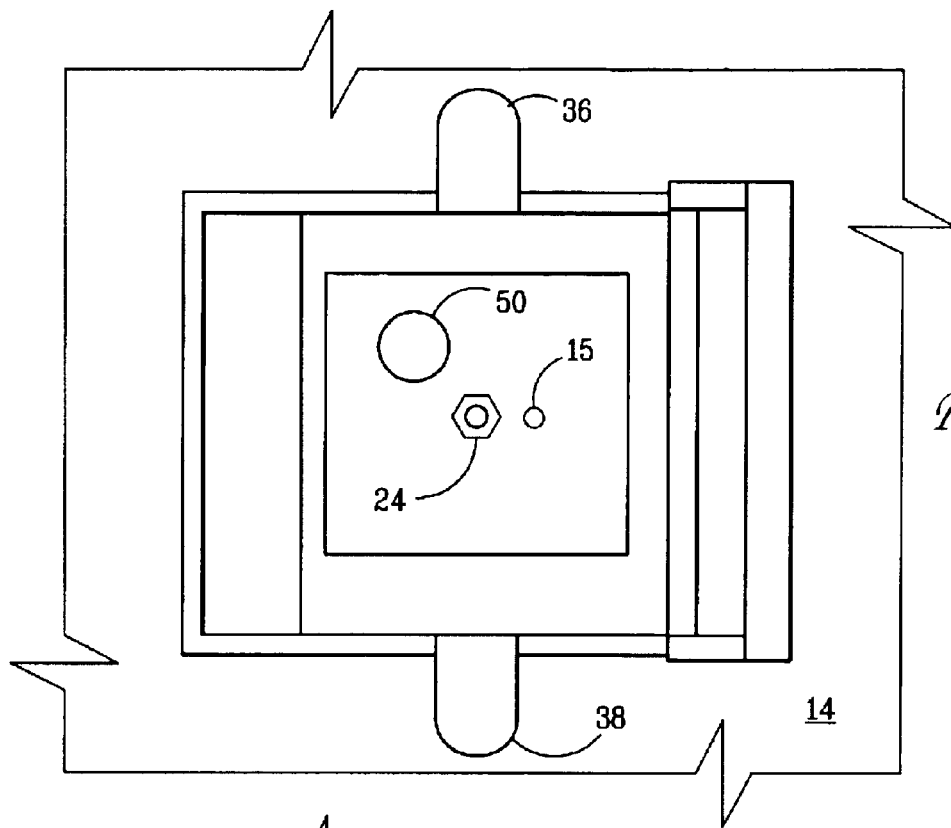
FIG. 3 is a plan view taken along line 3—3 of FIG. 1.

Reference is now made to the embodiments illustrated in FIGS. 1 through 13, wherein like numerals are used to designate like parts throughout.

Although the present invention is described in terms of a burner for use in connection with a furnace or an industrial furnace, it will be apparent to one of skill in the art that the teachings of the present invention also have applicability to other process components such as, for example, boilers. Thus, the term furnace herein shall be understood to mean furnaces, boilers and other applicable process components.

Referring now to FIGS. 1 through 4, a burner 10 includes a freestanding burner tube 12 located in a well in a furnace floor 14. Burner tube 12 includes an upstream end 16, a downstream end 18 and a venturi portion 19. Burner tip 20 is located at downstream end 18 and is surrounded by an annular tile 22. An improved fuel spud, which may be fuel spud 424 of FIG. 5E, is located at upstream end 16 and introduces fuel gas into burner tube 12. Fresh or ambient air is introduced into primary air chamber 26 through adjustable damper 28 to mix with the fuel gas at upstream end 16 of burner tube 12. Combustion of the fuel gas and fresh air occurs downstream of burner tip 20.

Figure 4:
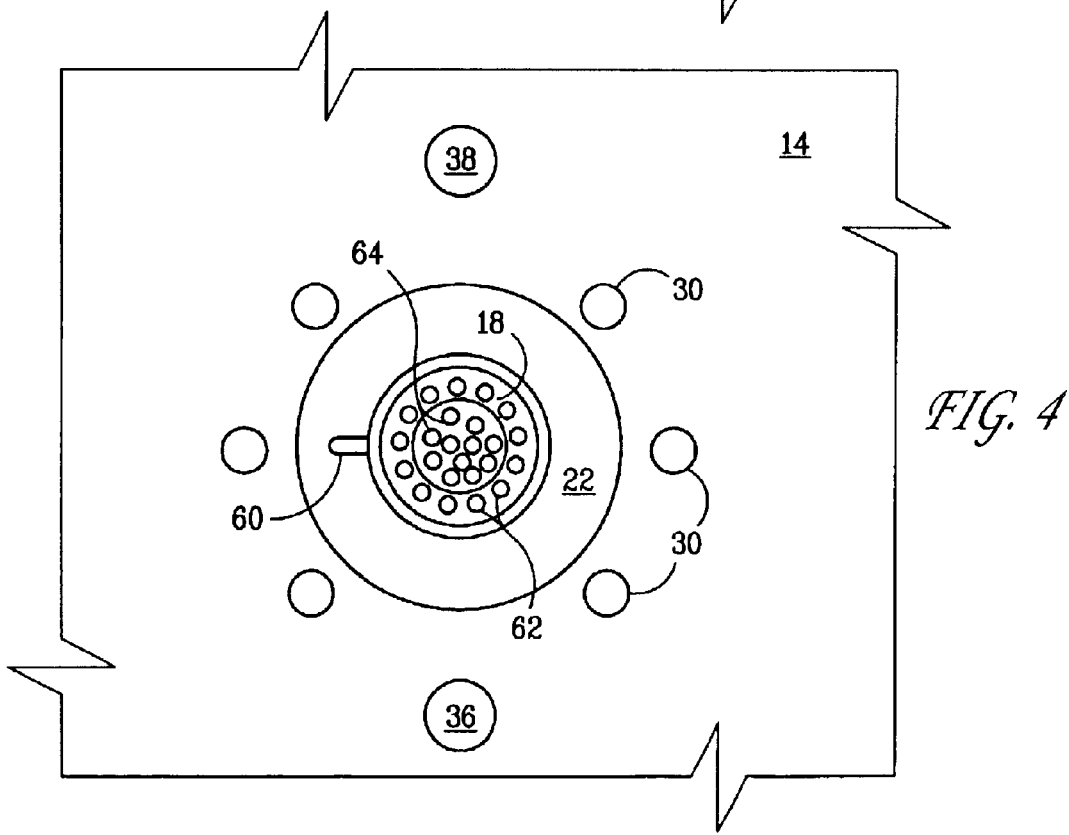
FIG. 4 is a plan view taken along line 4—4 of FIG. 1.

FIG. 4 presents a top plan view showing burner tip 20 in more detail. In operation, side-ports 62 direct a fraction of the fuel gas across the face of annular tile 22, while center ports 64 direct the major portion of the fuel gas into the furnace.

A plurality of air ports 30 originate in secondary air chamber 32 and pass through furnace floor 14 into the furnace. Fresh air enters secondary air chamber 32 through adjustable dampers 34 and passes through staged air ports 30 into the furnace to provide secondary or staged combustion, as described in U.S. Pat. No. 4,629,413.

In order to recirculate flue gas from the furnace to the primary air chamber, ducts or pipes 36, 38 extend from openings 40, 42, respectively, in the floor of the furnace to openings 44, 46, respectively, in burner plenum 48. Flue gas containing, for example, about 6–10% oxygen ($O_2$) is drawn through pipes 36, 38 by the inspirating effect of fuel gas passing through venturi portion 19 of burner tube 12. In this manner, the primary air and flue gas are mixed in primary air chamber 26, which is prior to the zone of combustion. Therefore, the amount of inert material mixed with the fuel is raised, thereby reducing the flame temperature and, as a result, reducing $NO_x$ emissions. Closing or partially closing damper 28 restricts the amount of fresh air that can be drawn into the primary air chamber 26 and thereby provides the vacuum necessary to draw flue gas from the furnace.

Unmixed low temperature ambient air, having entered secondary air chamber 32 through dampers 34 and having passed through air ports 30 into the furnace, is also drawn through pipes 36, 38 into the primary air chamber by the inspirating effect of the fuel gas passing through venturi portion 19. The ambient air may be fresh air as discussed above. The mixing of the ambient air with the flue gas lowers the temperature of the hot flue gas flowing through pipes 36, 38 and thereby substantially increases the life of the pipes and permits use of this type of burner to reduce $NO_x$ emission in high temperature cracking furnaces having flue gas temperature above 1900° F. in the radiant section of the furnace.

A mixture of from about 20% to about 80% flue gas and from about 20% to about 80% ambient air should be drawn through pipes 36, 38. It is particularly preferred that a mixture of about 50% flue gas and about 50% ambient air be employed. The desired proportions of flue gas and ambient air may be achieved by proper sizing, placement and/or design of pipes 36, 38 in relation to air ports 30, as those skilled in the art will readily recognize. That is, the geometry of the air ports, including but not limited to their distance from the burner tube, the number of air ports, and the size of the air ports, may be varied to obtain the desired percentages of flue gas and ambient air.

Figure 5A:
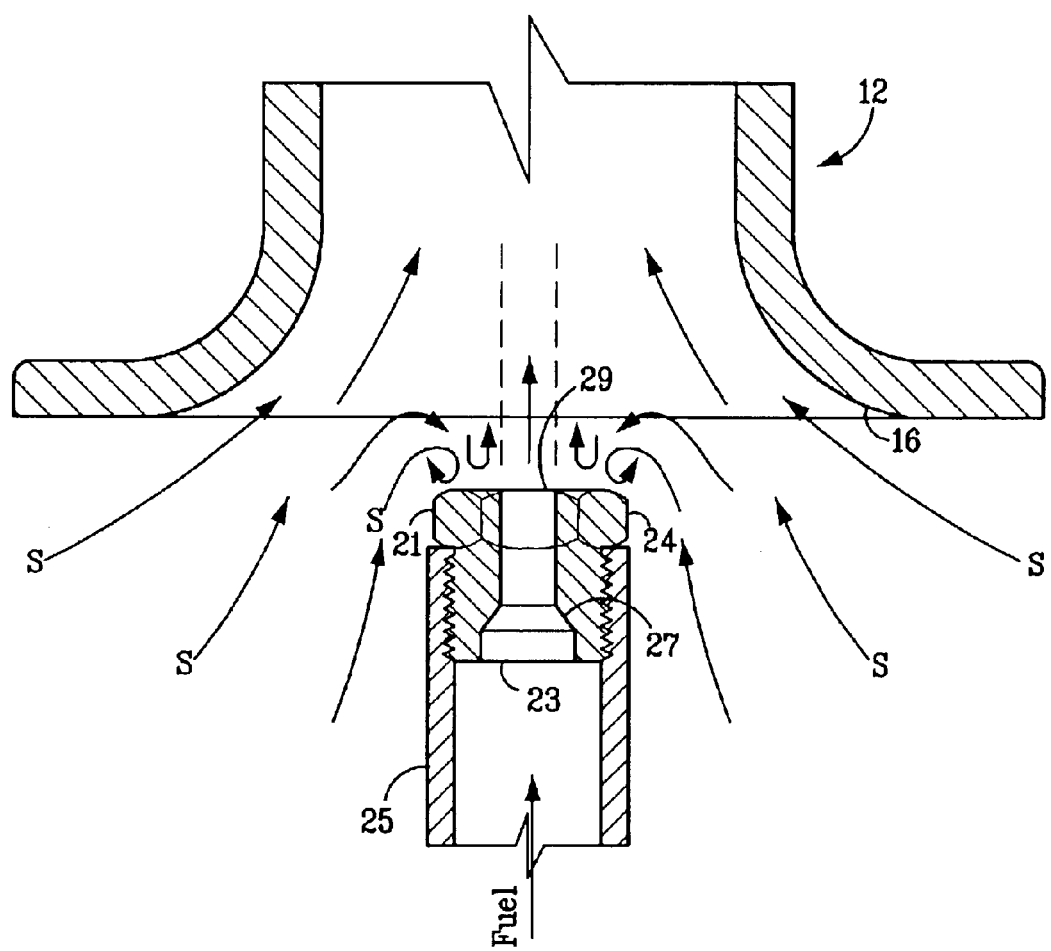
FIG. 5A is a cross-sectional view of a prior art fuel spud.

Referring now to FIG. 5A, a conventional fuel spud 24 is shown. Fuel spud 24 is affixed to the outlet end of fuel gas supply pipe 25, preferably by threads, as shown. Fuel spud 24 is aligned with the upstream end 16 of burner tube 12, so that fuel gas exiting the outlet end 29 of fuel spud 24 will be drawn into the upstream end 16 of burner tube 12, together with primary air and recirculated flue gas. As shown, the inner diameter of the inlet end 23 of fuel spud 24 transitions to a smaller diameter at outlet end 29 through the use of transition section 27. The outer surface 21 of fuel spud 24 is exposed to the venturi inlet flow stream, represented by streamlines S. Outer surface 21 is in the form of a hex-shaped nut, for ease in installation.

While outer surface 21 may be helpful in the installation of fuel spud 24, as is illustrated by streamlines S of FIG. 5A, when air is drawn into the venturi inlet 16, flow past the edges of fuel spud 24 generates a zone of eddies and turbulence immediately adjacent to the highest velocity portion of fuel spud 24. The energy dissipated in this zone of eddies has been discovered to reduce the inspirating efficiency of the fuel spud 24 and burner tube 12 venturi combination. This inefficiency has been found to limit the FGR ratio achievable in the burner.

Figure 5B:
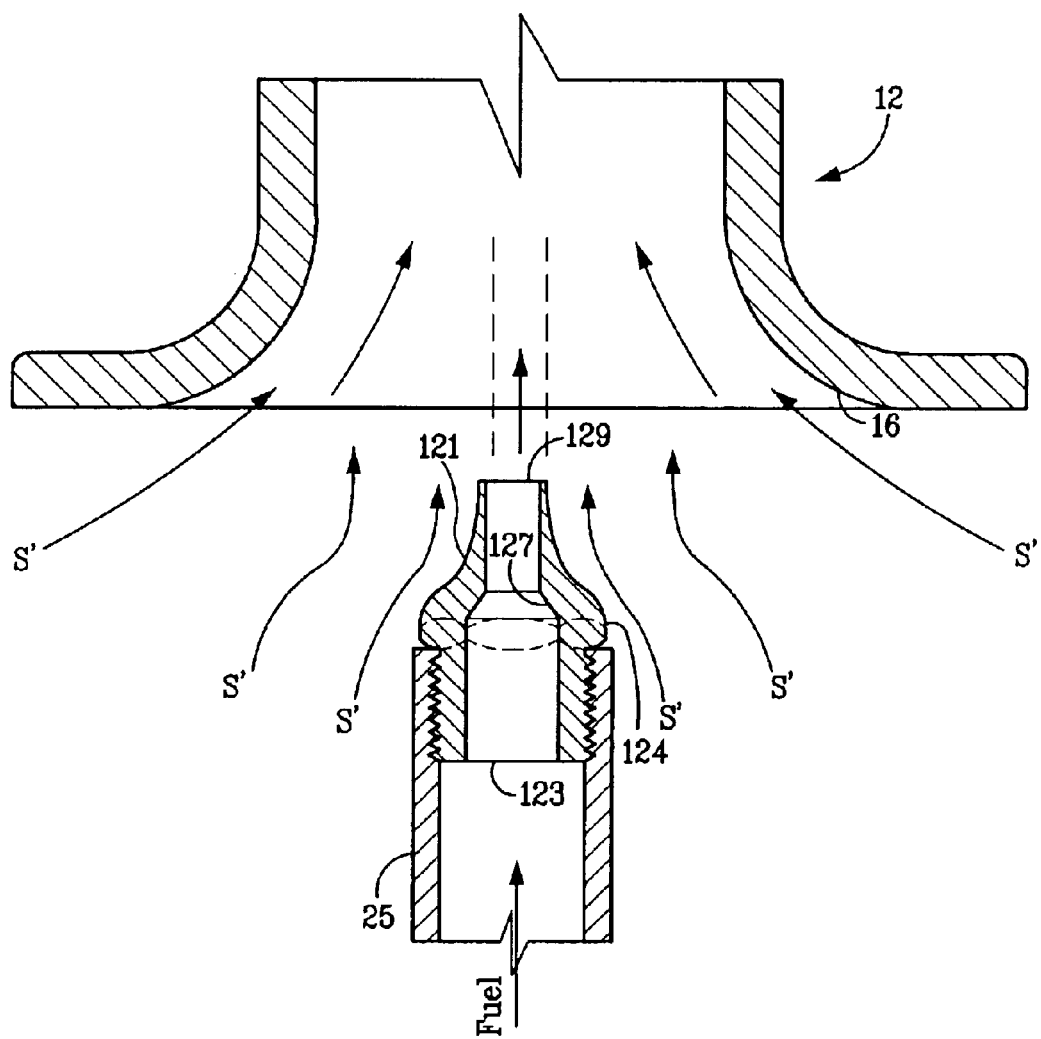
FIG. 5B is a cross-sectional view of one embodiment of an improved fuel spud in accordance with the present invention.

FIG. 5B depicts a fuel spud 124, designed in accordance with the present invention. As shown, fuel spud 124 employs a smoothly profiled outer surface 121 to eliminate flow separation and eddies as the air and recycled flue gas pass over fuel spud 124 into upstream end 16 of burner tube 12. As schematically depicted by flow streamlines S', eddies and turbulence are minimized, thus improving the inspirating efficiency of the system. As a result of this improvement, higher FGR ratios and lower $NO_x$ emissions can be achieved.

Figure 5C:
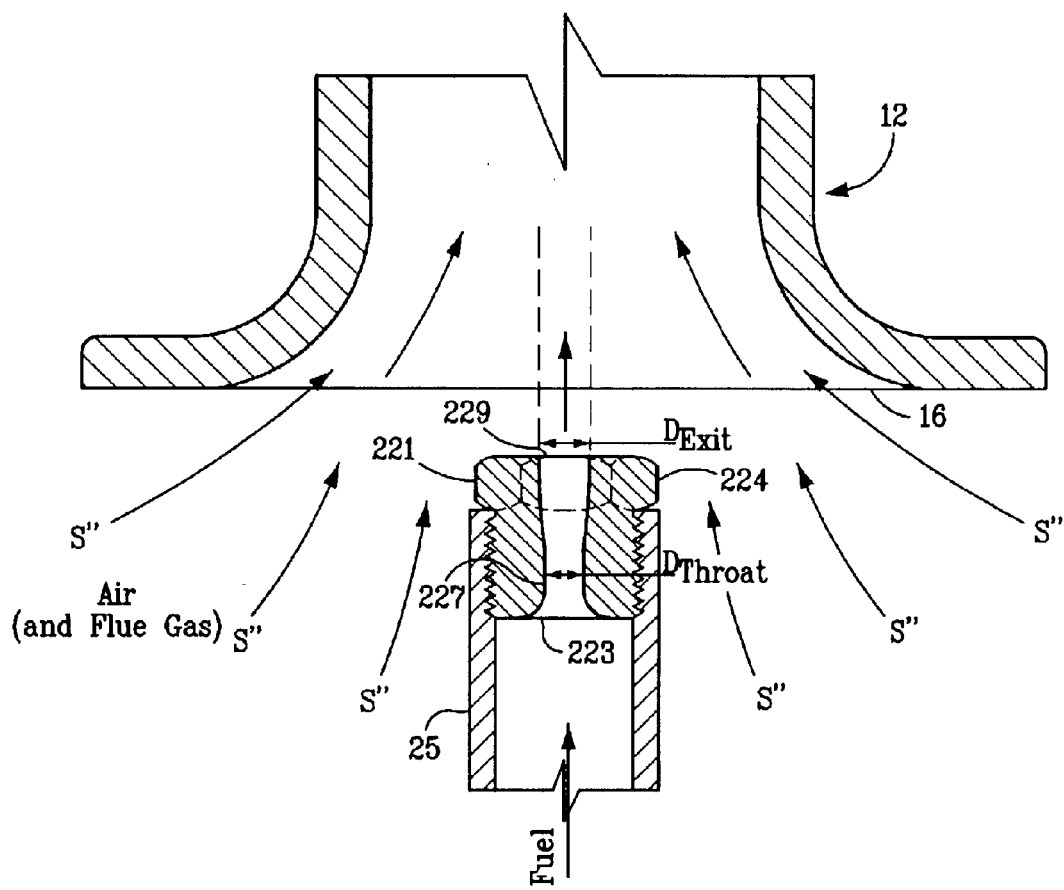
FIG. 5C is a cross-sectional view of another embodiment of an improved fuel spud in accordance with the present invention.

FIG. 5C illustrates another fuel spud 224, designed in accordance with the present invention. As may be appreciated by one skilled in the art, the fuel spud/burner tube venturi combination inspirates air (or air plus flue-gas) via the transfer of momentum from the fuel to the air (or air plus flue-gas) in the burner tube 12 venturi. The momentum of a flowing stream is defined as the product of the mass flow rate and velocity. In a burner, the mass flow rate of the fuel stream is defined by the heat release required of the burner. The diameter of the fuel spud is established by the available upstream pressure in the fuel gas supply system. Thus, the momentum achieved in the fuel jet as it exits the fuel spud is a function of the exit velocity. For a fuel spud of the geometry shown in FIG. 5A or FIG. 5B, the laws of compressible gas flow suggest that the flow at the exit of the fuel spud cannot exceed Mach 1, that is, the speed of sound in the gas stream.

If the exit velocity of the gas jet could be increased above Mach 1, the inspirating effect of the fuel spud/burner tube/venturi combination could be increased. In the case of a burner employing FGR, higher FGR ratios could be achieved and $NO_x$ emissions reduced. The use of a converging-diverging nozzle can generate a supersonic gas jet at the exit of the fuel spud. Such geometries are variously known as "Laval nozzles" or "critical flow venturis."

Figure 5D:
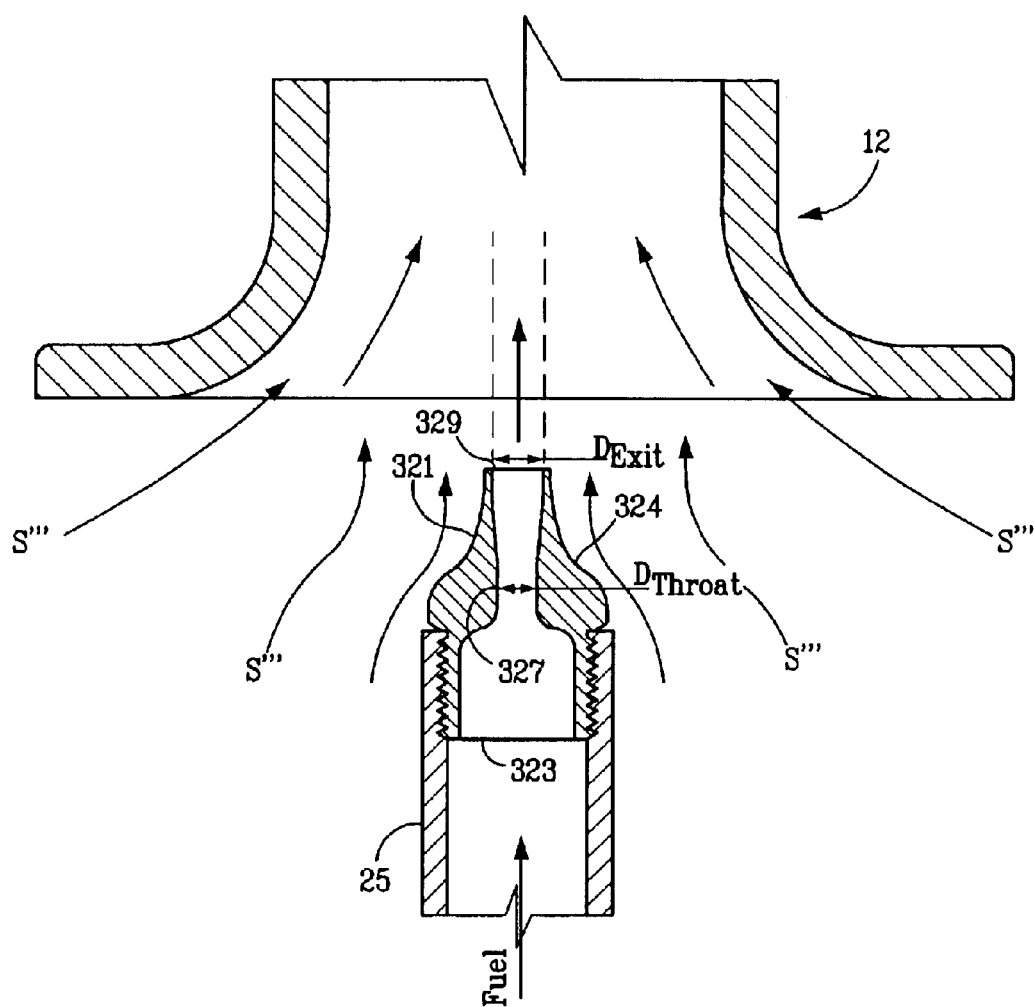
FIG. 5D is a cross-sectional view of yet another improved fuel spud in accordance with the present invention.
Figure 5E:
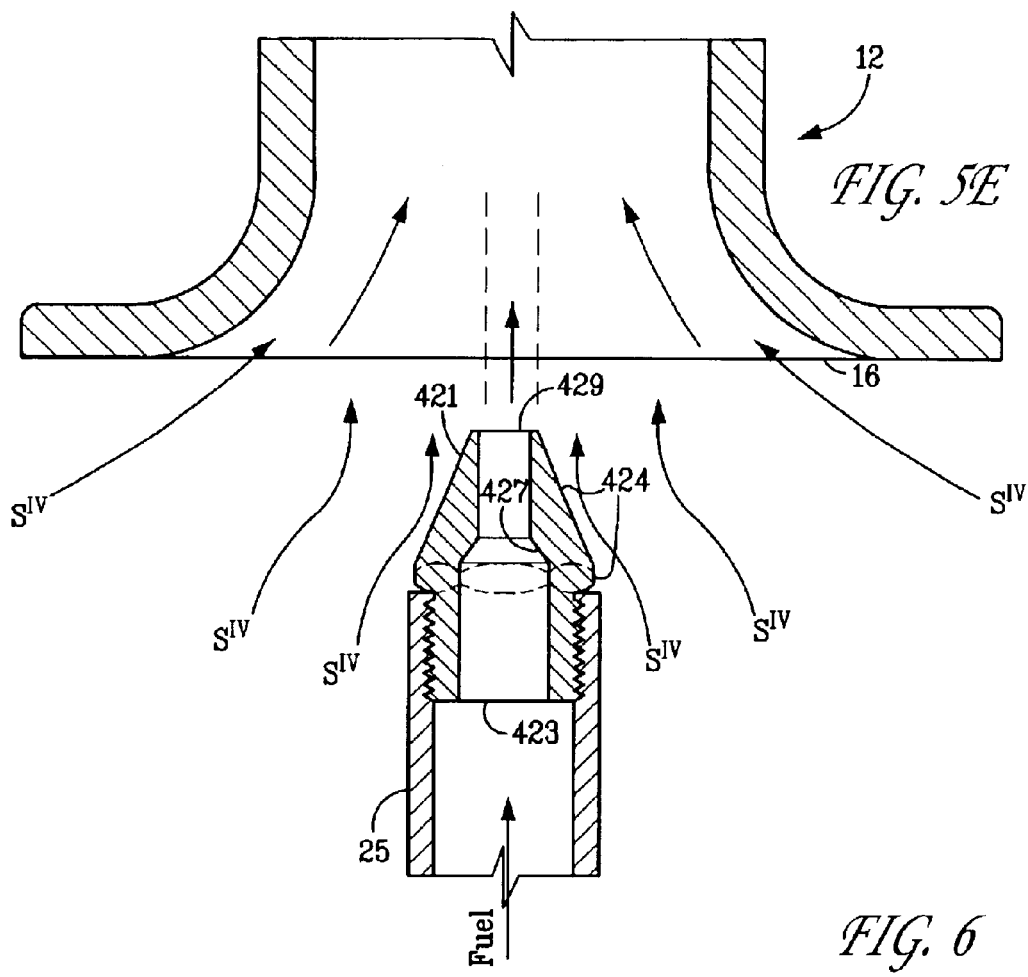
FIG. 5E is a cross-sectional view of another embodiment of an improved fuel spud in accordance with the present invention.

Referring now to FIGS. 5C and 5D, gas-spuds 224 and 324 are shown, each employing Laval nozzles 227 and 327, respectively. Additionally, fuel spud 324 advantageously employs both the Laval nozzle internal profile 327, and the low-eddy external surface profile 321, described above. $S'''$ and $S^{iv}$ depict flow streamlines.

FIG. 5E depicts a fuel spud 424, designed in accordance with another preferred form. As shown, fuel spud 424 employs a smoothly profiled outer surface 421, which takes the form of a frustum of a cone, to eliminate flow separation and eddies as the air and recycled flue gas pass over fuel spud 424 into upstream end 16 of burner tube 12. As schematically depicted by flow streamlines $S^{iv}$, eddies and turbulence are minimized, thus improving the inspirating efficiency of the system. As a result of this improvement, higher FGR ratios and lower $NO_x$ emissions can be achieved.

Referring again to FIGS. 1 and 2, a very small gap exists between the burner tip 20 and the burner tile 22. By precisely engineering this gap, the bulk of the secondary staged air is forced to enter the furnace through staged air ports 30 located some distance from the primary combustion zone, which is located immediately on the furnace side of the burner tip 20.

Lighting port 50 is provided in the burner plenum 48, both to allow inspection of the interior of the burner assembly, and to provide access for lighting of the burner through lighting chamber 60 (see FIG. 4). The lighting port 50 is aligned with lighting chamber 60, which is adjacent to the first opening in the furnace. Lighting chamber 60 is located at a distance from burner tip 20 effective for burner light off. A lighting torch or igniter (not shown) of the type disclosed in U.S. Pat. No. 5,092,761 has utility in the start-up of the burner. To operate the burner of the present invention, the torch or igniter is inserted through light-off tube 50 into the lighting chamber 60, which is adjacent burner tip 20, to light the burner.

Figure 6:
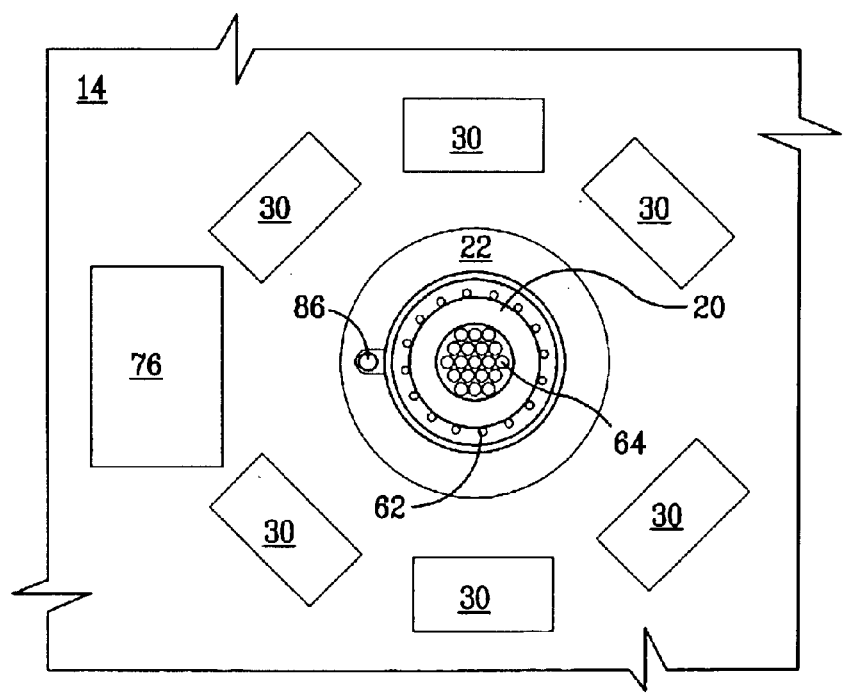
FIG. 6 is a is a plan view taken along line 6—6 of FIG. 7.
Figure 7:
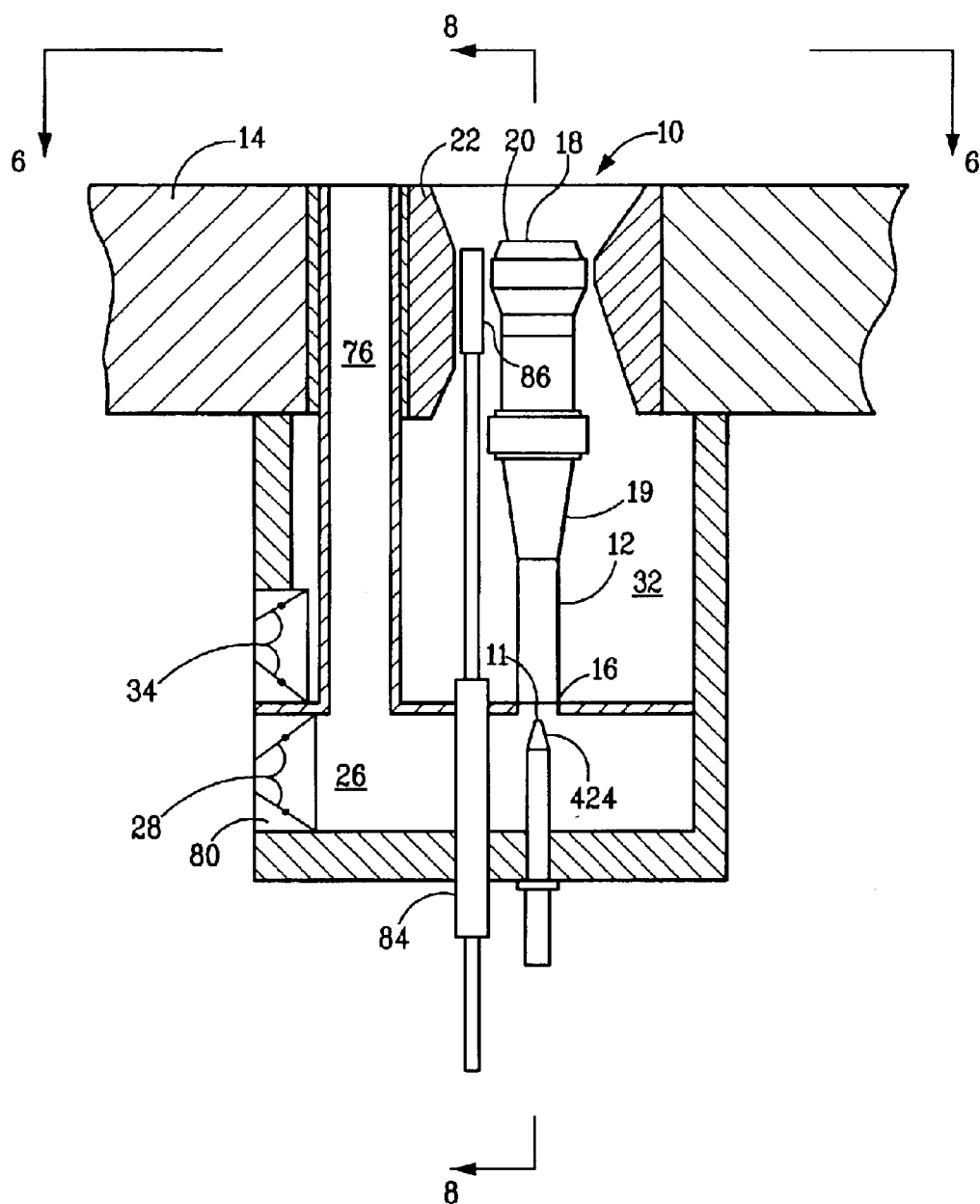
FIG. 7 is an elevation partly in section of a second embodiment of the premix burner of the present invention.
Figure 8:
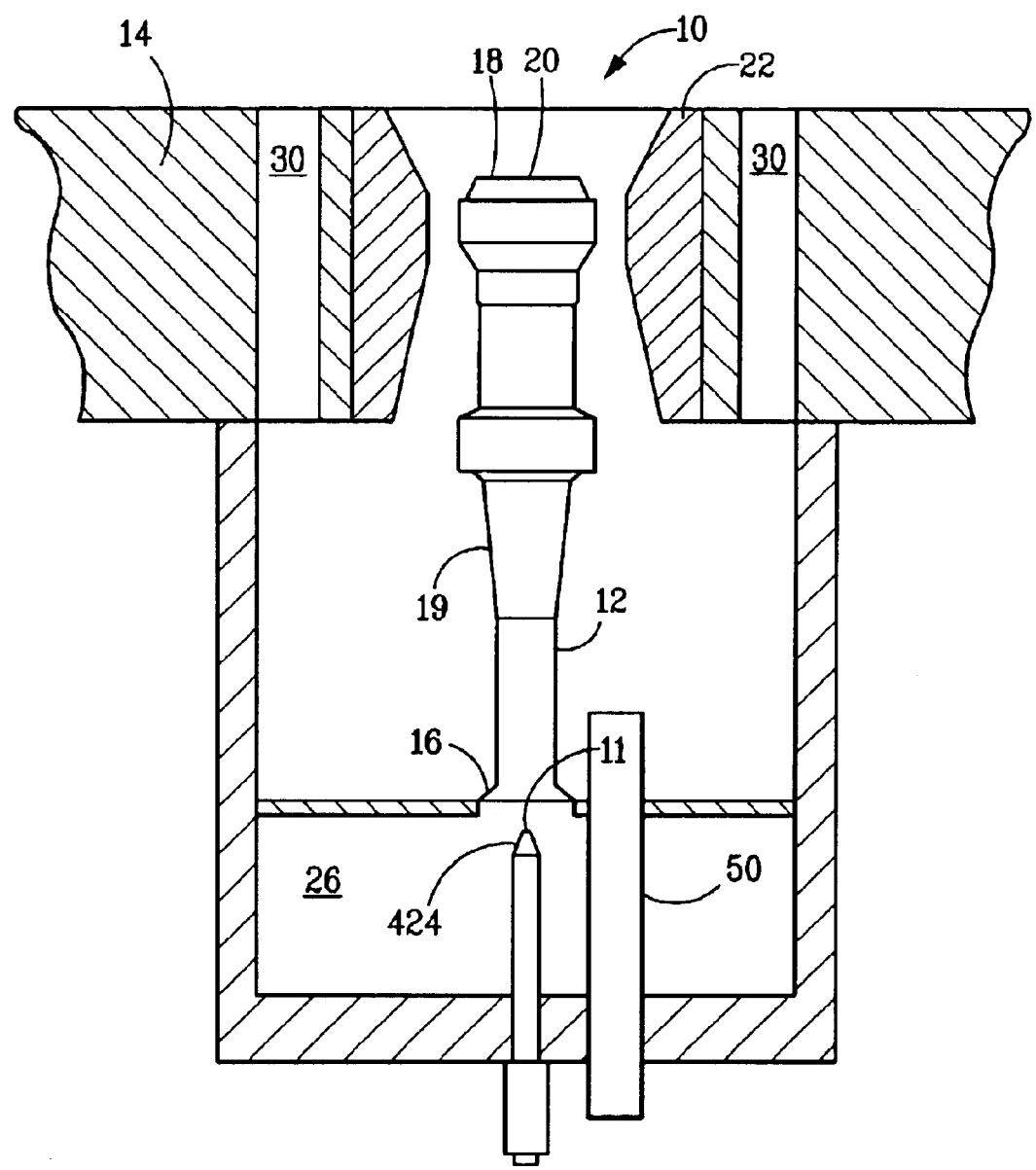
FIG. 8 is an elevation partly in section taken along line 8—8 of FIG. 7.

The improved fuel spuds of the present invention may also be used in a low $NO_x$ burner design of the type illustrated in FIGS. 6, 7 and 8, wherein like reference numbers indicate like parts. As with the embodiment of FIGS. 1–4, a burner 10 includes a freestanding burner tube 12 located in a well in a furnace floor 14. Burner tube 12 includes an upstream end 16, a downstream end 18 and a venturi portion 19. Burner tip 20 is located at downstream end 18 and is surrounded by an annular tile 22. Once again, an improved fuel spud of the present invention, which may be fuel spud 424 of FIG. 5E, is located at upstream end 16 and introduces fuel gas into burner tube 12. Fresh or ambient air is introduced into primary air chamber 26 through adjustable damper 28 to mix with the fuel gas at upstream end 16 of burner tube 12. Combustion of the fuel gas and fresh air occurs downstream of the burner tip 20.

Referring again to FIG. 5E, a fuel spud 424 is shown that employs a smoothly profiled outer surface 421 to eliminate flow separation and eddies as the air and recycled flue-gas pass over fuel spud 424 into upstream end 16 of burner tube 12. Fuel spud 124 of FIG. 5B employs a smoothly profiled outer surface 121, while as indicated above, fuel spuds 224 and 324, shown in FIGS. 5C and 5D each employ Laval nozzles 227 and 327, respectively. Fuel spud 324 also employs the low-eddy external surface profile 321. Each of the fuel spud designs depicted in FIGS. 5B through 5E have utility in the burner depicted in FIGS. 6 through 8.

A plurality of air ports 30 originates in secondary air chamber 32 and pass through furnace floor 14 into the furnace. Fresh air enters secondary air chamber 32 through adjustable dampers 34 and passes through staged air ports 30 into the furnace to provide secondary or staged combustion.

In order to recirculate flue gas from the furnace to the primary air chamber, a flue gas recirculation passageway 76 is formed in furnace floor 14 and extends to primary air chamber 26, so that flue gas is mixed with fresh air drawn into the primary air chamber from opening 80 through dampers 28. Flue gas containing, for example, from about 6 to about 10% $O_2$ is drawn through passageway 76 by the inspirating effect of fuel gas passing through venturi portion 19 of burner tube 12. As with the embodiment of FIGS. 1 through 4, the primary air and flue gas are mixed in primary air chamber 26, which is prior to the zone of combustion. Closing or partially closing damper 28 restricts the amount of fresh air that can be drawn into the primary air chamber 26 and thereby provides the vacuum necessary to draw flue gas from the furnace floor.

As with the embodiment of FIGS. 1 through 4, a mixture of from 20% to about 80% flue gas and from about 20% to about 80% ambient air should be drawn through passageway 76. It is particularly preferred that a mixture of about 50% flue gas and about 50% ambient air be employed. The desired proportions of flue gas and ambient air may be achieved by proper sizing, placement and/or design of flue gas recirculation passageway 76 and air ports 30; that is, the geometry and location of the air ports may be varied to obtain the desired percentages of flue gas and ambient air.

Sight and lighting port 50 provides access to the interior of secondary chamber 32 for a lighting torch or igniter (not shown). As with the embodiment of present invention depicted in FIGS. 1–4, a lighting torch or igniter of the type disclosed in U.S. Pat. No. 5,092,761 has utility in this embodiment of the present invention. Sight and lighting port 50 allows inspection of the interior of the burner assembly and access for lighting of the optional pilot 86, which is adjacent to the first opening in the furnace and positioned within tube 84.

In operation of the burner of FIGS. 6 through 8, fuel spud 424 discharges fuel into burner tube 12, where it mixes with primary air and recirculated flue-gas. The mixture of fuel gas, recirculated flue gas and primary air then discharges from burner tip 20. The mixture in the venturi portion 19 of burner tube 12 is maintained below the fuel-rich flammability limit; i.e. there is insufficient air in the venturi to support combustion. Staged, secondary air is added to provide the remainder of the air required for combustion. The majority of the staged air is added a finite distance away from the burner tip 20 through staged air ports 30. However a portion of the staged, secondary air passes between the burner tip 20 and the annular tile 22 and is immediately available to the fuel exiting the side ports 62 of burner tip 20. As indicated, side-ports 62 direct a fraction of the fuel across the face of the annular tile 22, while center ports 64, direct the major portion of the fuel into the furnace.

As may be envisioned, two combustion zones are established. A small combustion zone is established across the face of the annular tile 22, emanating from the fuel gas combusted in the region of the side-ports 62, while a much larger combustion zone is established projecting into the furnace firebox, emanating form the fuel gas combusted from the center ports 64. In operation, the larger combustion zone represents an approximately cylindrical face of combustion extending up from the burner, where the staged air flowing primarily from air ports 30 meets the fuel-rich mixture exiting from the burner tip center ports 64.

Figure 11:
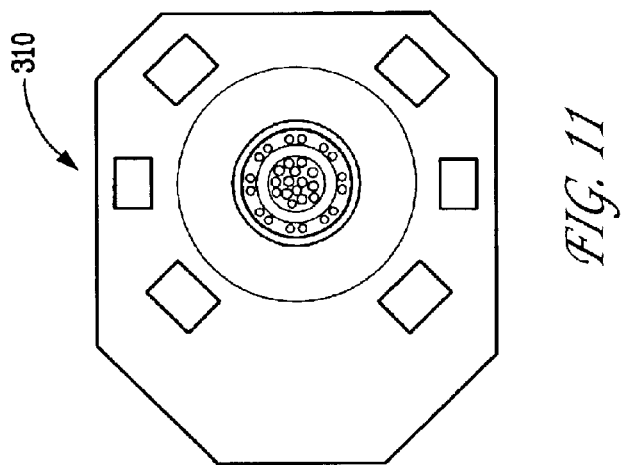
FIG. 11 is a plan view of an embodiment of the present invention employing external FGR.
Figure 10:
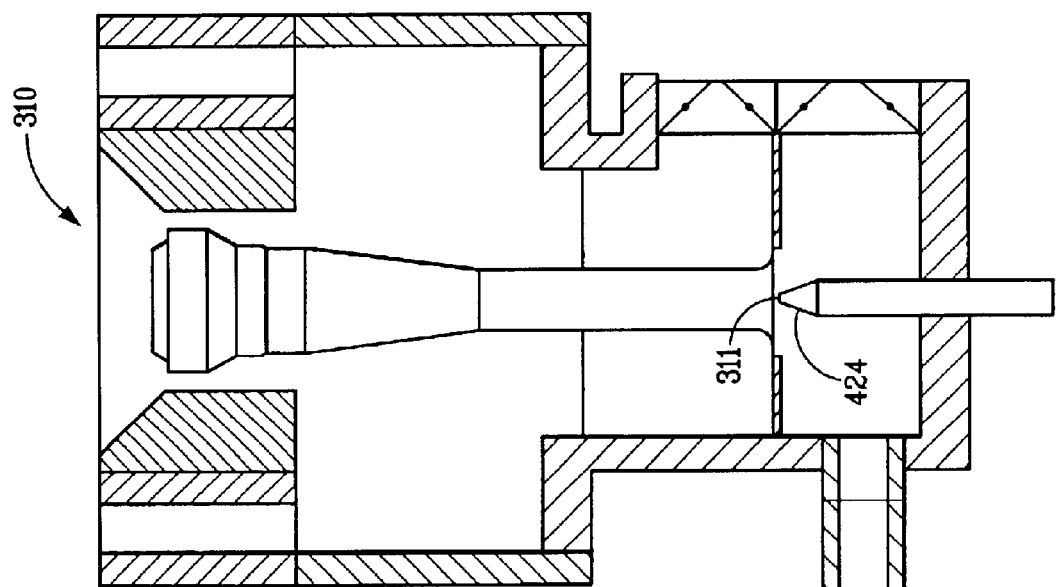
FIG. 10 is an elevation view of an embodiment of the present invention employing external FGR.
Figure 10:
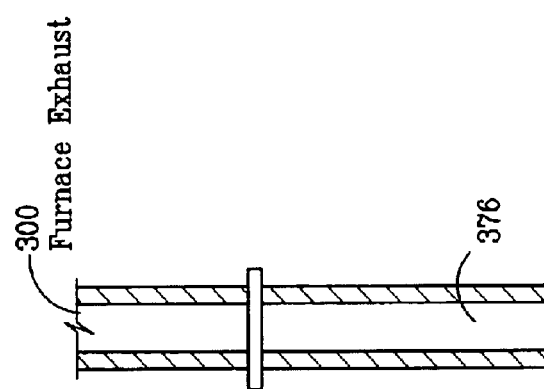

Referring to FIGS. 10 and 11, another embodiment of the present invention is illustrated. In this embodiment, the teachings above with respect to the fuel spuds of the present invention (such as fuel spud 424, as shown in FIG. 5E) may be applied in connection with a furnace having one or more burners utilizing an external FGR duct 376 in fluid communication with a furnace exhaust 300. It will be understood by one of skill in the art that several burners 310 will be located within the furnace, all of which feed furnace exhaust 300 and external FGR duct 376. The benefit with respect to improved inspiration produced by the fuel spuds of the present invention serve to increase the motive force available to draw flue gas through FGR duct 376.

Figure 12:
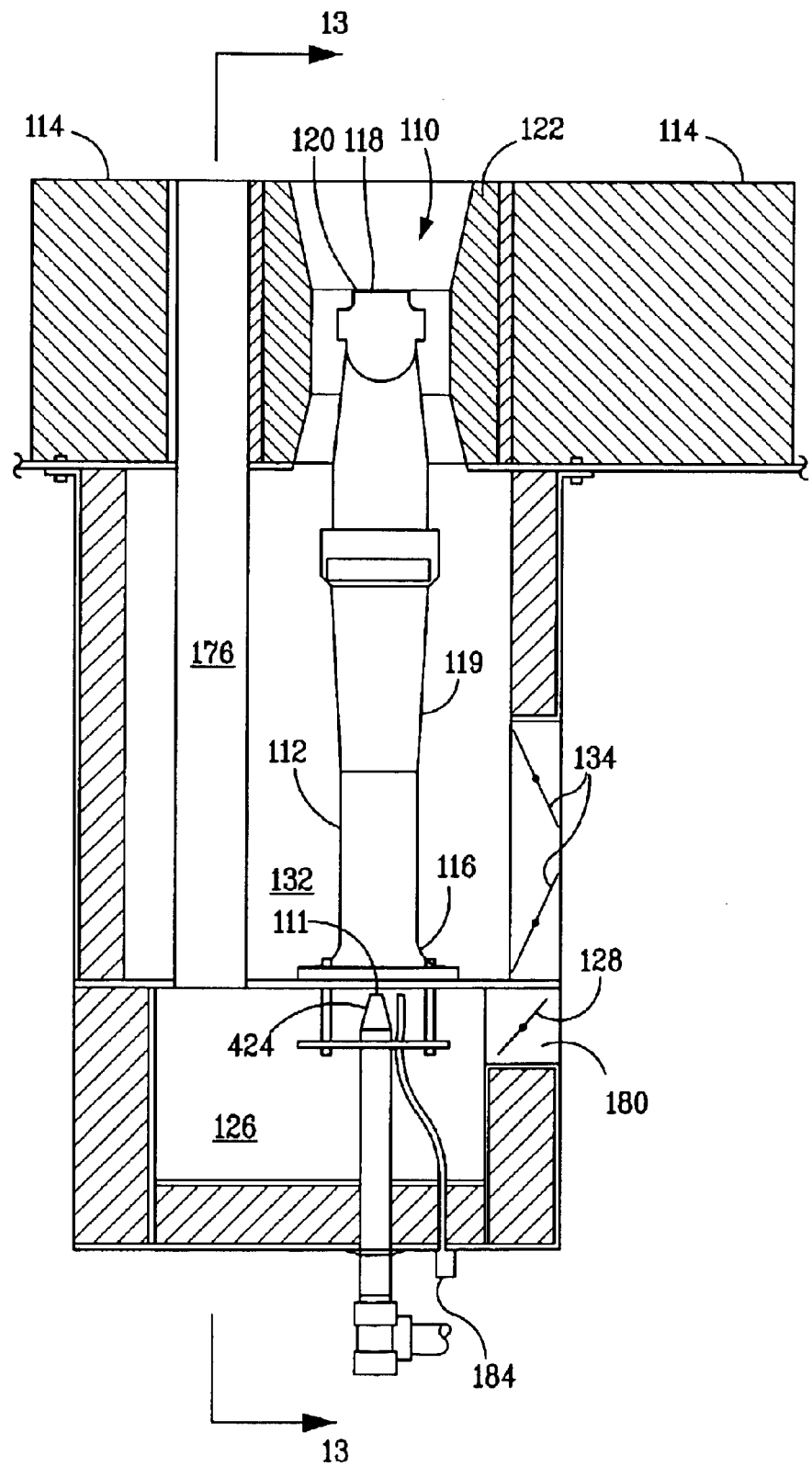
FIG. 12 illustrates an elevation partly in section of an embodiment of a flat-flame burner of the present invention.
Figure 13:
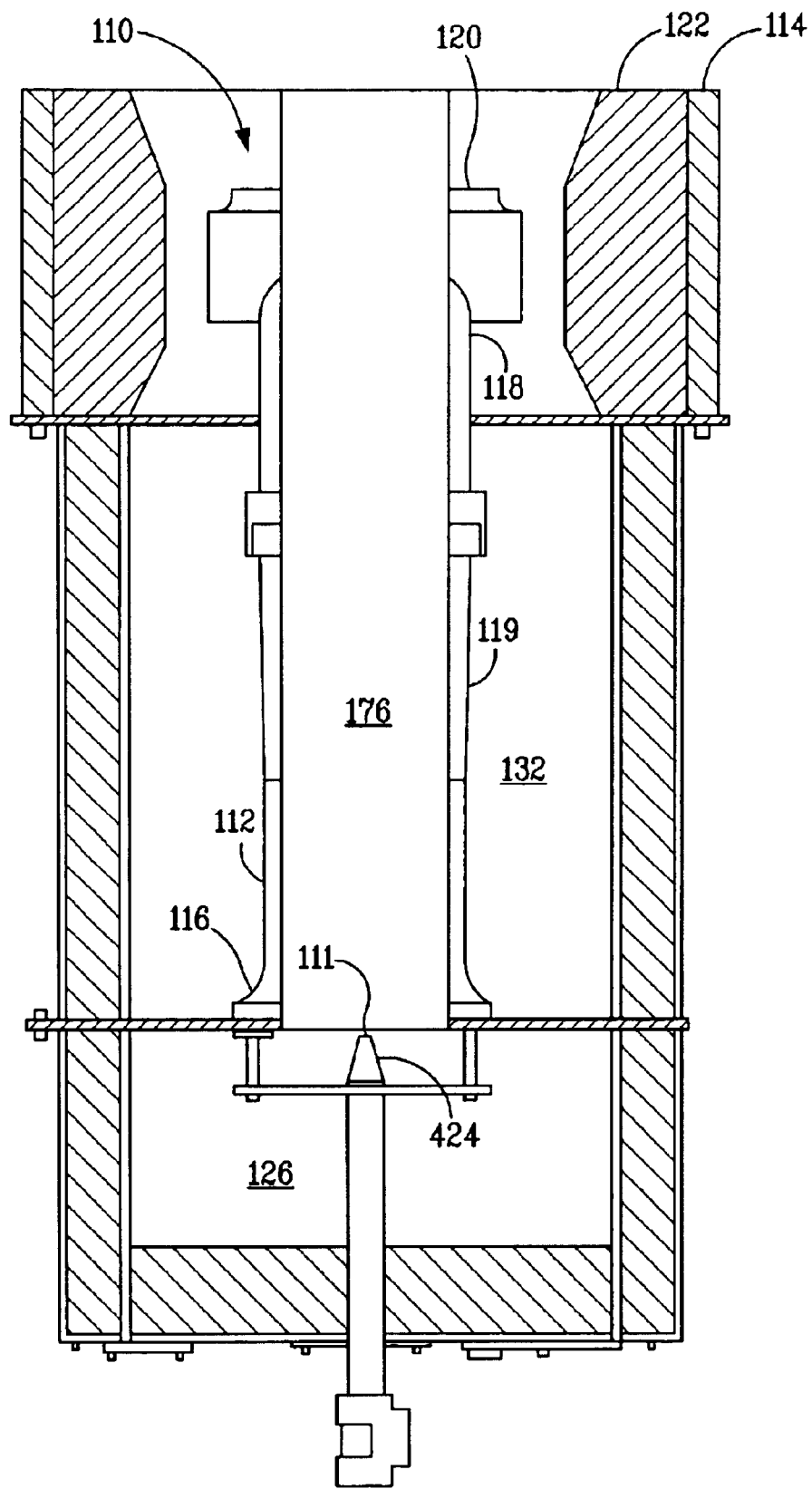
FIG. 13 is an elevation partly in section of the embodiment of a flat-flame burner of FIG. 12 taken along line 13—13 of FIG. 12.

Benefits similar to those described above through the use of the fuel spud of the present invention can be achieved in flat-flame burners, as will now be described by reference to FIGS. 12 and 13.

A premix burner 110 includes a freestanding burner tube 112 located in a well in a furnace floor 114. Burner tube 112 includes an upstream end 116, a downstream end 118 and a venturi portion 119. Burner tip 120 is located at downstream end 118 and is surrounded by a peripheral tile 122. Fuel spud 424 is located at upstream end 116 and introduces fuel gas into burner tube 112. Fresh or ambient air may be introduced into primary air chamber 126 to mix with the fuel gas at upstream end 116 of burner tube 112. Combustion of the fuel gas and fresh air occurs downstream of burner tip 120. Fresh secondary air enters secondary chamber 132 through dampers 134.

In order to recirculate flue gas from the furnace to the primary air chamber, a flue gas recirculation passageway 176 is formed in furnace floor 114 and extends to primary air chamber 126, so that flue gas is mixed with fresh air drawn into the primary air chamber from opening 180 through dampers 128. Flue gas containing, for example, 6 to about 10% $O_2$ is drawn through passageway 176 by the inspirating effect of fuel gas passing through venturi portion 119 of burner tube 112. Primary air and flue gas are mixed in primary air chamber 126, which is prior to the zone of combustion.

In operation, fuel spud 424 discharges fuel into burner tube 112, where it mixes with primary air, recirculated flue-gas or mixtures thereof. The mixture of fuel gas and recirculated flue-gas, primary air or mixtures thereof then discharges from burner tip 120. The mixture in the venturi portion 119 of burner tube 112 is maintained below the fuel-rich flammability limit; i.e. there is insufficient air in the venturi to support combustion. Secondary air is added to provide the remainder of the air required for combustion. The majority of the secondary air is added a finite distance away from the burner tip 120.

As with previous embodiments and as detailed specifically in FIG. 5E, fuel spud 424 employs a smoothly profiled outer surface 421 to eliminate flow separation and eddies as the air and recycled flue-gas pass over fuel spud 424 into upstream end 116 of burner tube 112. As schematically depicted by flow streamlines $S^{iv}$, eddies and turbulence are minimized, thus improving the inspirating efficiency of the system. As a result of this improvement, higher FGR ratios and lower $NO_x$ emissions can be achieved in a flat flame FGR burner. The FIGS. 5B, 5C or 5D embodiments of the present invention may also be alternatively employed in connection with a flat flame FGR burner configuration as described above.

As may be appreciated by those skilled in the art, the fuel spud designs of the present invention can be incorporated in new burners or can be retrofitted into existing burners.

Unlike prior designs, use of the fuel spud designs of the present invention serve to improve the inspiration characteristics of the fuel spud/burner tube/venturi combination, increasing the ability to utilize higher levels of FGR and reduce $NO_x$ emissions, as demonstrated by the Examples below.

In addition to the use of flue gas as a diluent, another technique to achieve lower flame temperature through dilution is through the use of steam injection. (See, for example, steam injection tube 15 of FIG. 2 and steam injection tube 184 of FIG. 12). Steam can be injected in the primary air or the secondary air chamber. Preferably, steam may be injected upstream of the venturi.

EXAMPLES

Example 1

The following example demonstrates that using a converging/diverging Laval nozzle fuel spud can increase gas velocity (and hence momentum). The following burner condition was studied: fuel rate=348 lb./hr; fuel composition=$CH_4$; fuel upstream temperature=60° F.; fuel upstream pressure=50 psig. A fuel spud throat diameter= 0.3360 inch was selected. Three different nozzle outlet diameters were evaluated for their impact on exit pressure and exit velocity. The results of the analysis follow:

| Nozzle Exhaust Diameter | Gas Pressure at Nozzle Exit | Gas Velocity at Nozzle Exit |
| --- | --- | --- |
| 0.3855 inches | 0.0 psig | 2,014 ft/sec |
| 0.3611 inches | 5.0 psig | 1,833 ft/sec |
| 0.3467 inches | 10.0 psig | 1,670 ft/sec |

As may be seen, the highest gas velocity achievable occurred at a nozzle exhaust diameter of 0.3855 inches (gas exit pressure=0.0 psig). This increase in velocity and momentum directionally improves the inspirating capability of the fuel spud/venturi combination, permitting the FGR ratio to be increased on a burner so equipped.

Examples 2–4

These examples demonstrate that using a variable fuel preheating system to control fuel supply rates can eliminate the primary problem associated with variations in firing rates in a converging/diverging Laval nozzle fuel spud.

Example 2

Fueling rate for the optimized nozzle of Example 1 (nozzle exhaust diameter of 0.3855 inches) was reduced to 233 lb./hr., while using the same fuel (CH$_4$) and maintaining fuel upstream temperature at 60° F., fuel upstream pressure at 28.4 psig, spud throat diameter at 0.3360 inches.

At this fueling rate, the following results are predicted:

| Optimum Exhaust Diameter | Gas Pressure at Nozzle Exit | Gas Velocity at Nozzle Exit |
|---|---|---|
| 0.3534 inches | 0.0 psig | 1,755 ft/sec |

Example 3

To take the optimum nozzle design for the conditions of Example 2 and increase the firing rate to the level of Example 1 (348 lb./hr.) would be predicted to yield the following results:

| Nozzle Exhaust Diameter | Gas Pressure at Nozzle Exit | Gas Velocity at Nozzle Exit |
|---|---|---|
| 0.3534 inches | 7.0 psig | 1,766 ft/sec |

Example 4

The data below demonstrate that heating the fuel gas prior to feeding it to the fuel spud can yield optimal results, even as the heat release rate on the burner is reduced.

The fueling rate for the optimized nozzle of Example 1 (nozzle exhaust diameter of 0.3855 inches) was reduced to 233 lb./hr., while using the same fuel (CH$_4$) and increasing the fuel upstream temperature at 710° F. Fuel upstream pressure was maintained at 50 psig and spud throat diameter was held at 0.3360 inches.

At these conditions, the following results are predicted:

| Optimum Exhaust Diameter | Gas Pressure at Nozzle Exit | Gas Velocity at Nozzle Exit |
|---|---|---|
| 0.3855 inches | 0.0 psig | 3,021 ft/sec |

Figure 9A:
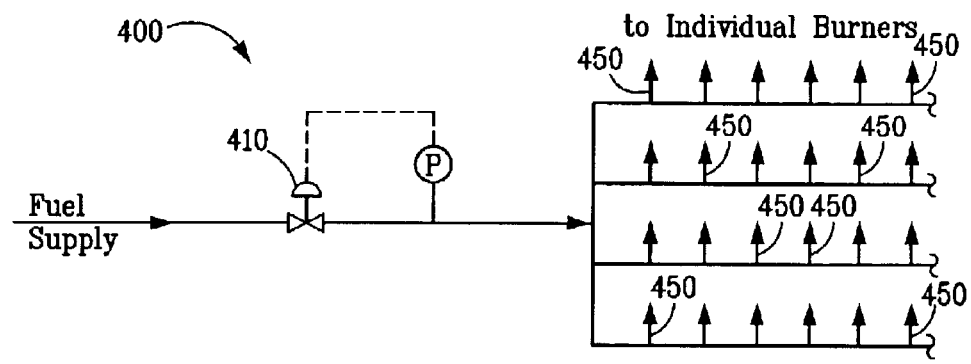
FIG. 9A illustrates a conventional fuel gas control system used in furnaces employing burners prior art burner systems.
Figure 9B:
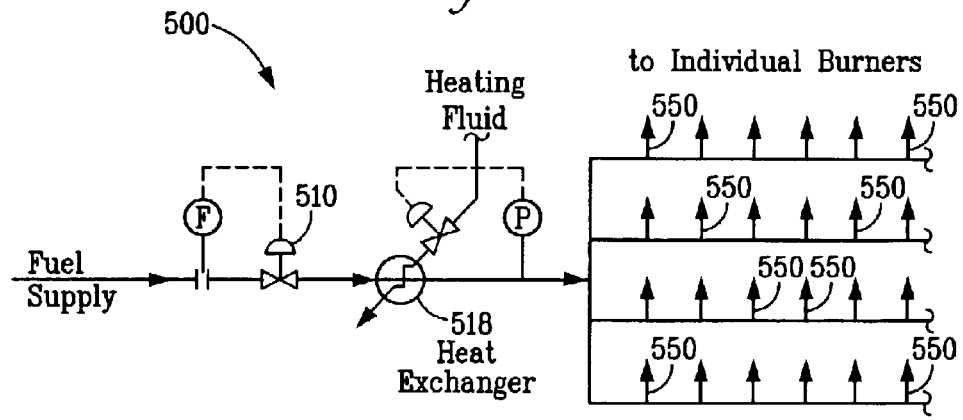
FIG. 9B illustrates a fuel supply control system in accordance with an embodiment of the present invention.

In order to achieve the benefits demonstrated in Example 4, a novel method of variable fuel preheat and fuel supply control was developed to eliminate this limitation of the Laval nozzle fuel spud and is shown in FIG. 9B. FIG. 9A illustrates a conventional fuel gas control system 400. The fuel gas pressure 406 upstream of the fuel spuds of burners 450 is controlled by a pressure control valve 410. Generally, the set-point for the pressure controller is reset by a higher level control application, such as the desired heat release, desired process outlet temperature or the like. In the fuel supply control system 500 of the present invention, shown in FIG. 9B, the fuel gas passes through a heater 518 prior to entering the burners 550. The quantity of fuel gas delivered to the burners 550 is controlled by a flow controller 510 rather than a pressure controller. The fuel flow controller 510 may be reset by a higher level controller such as heat release, desired process outlet temperature or the like. The temperature to which the fuel gas is heated is determined by the pressure at the burner inlets to provide optimum spud performance desired.

It will also be understood that the fuel spud described herein also has utility in traditional raw gas burners and raw gas burners having a pre-mix burner configuration wherein flue gas alone is mixed with fuel gas at the entrance to the burner tube. In fact, it has been found that the pre-mix, staged-air burners of the type described in detail herein can be operated with the primary air damper doors closed, with very satisfactory results.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A burner for the combustion of fuel gas in a furnace, said burner comprising:
   (a) a burner tube having a downstream end, and having an upstream end, said burner tube having a venturi therein;
   (b) a fuel spud located adjacent the upstream end of said burner tube, for introducing fuel gas into said burner tube;
   (c) a burner tip mounted on the downstream end of said burner tube adjacent a first opening in the furnace;
   (d) at least one passageway having a first end and a second end adjacent the upstream end of said burner tube;
   (e) means for drawing flue gas from said furnace, through said passageway, in response to an inspirating effect of uncombusted fuel gas exiting the fuel spud, said uncombusted fuel gas flowing through said burner tube from its upstream end towards its downstream end; and
   (f) means for increasing the inspirating effect of uncombusted fuel gas exiting said fuel spud;
   whereby said means for increasing the inspirating effect of uncombusted fuel gas exiting said fuel spud is effective to increase the amount of flue gas drawn from the furnace as compared to a burner without said means for increasing the inspirating effect.

2. The burner according to claim 1, wherein the burner is a pre-mix burner.

3. The burner according to claim 1, wherein the burner is a flat-flame burner.

4. The burner according to claim 1, wherein said at least one passageway is at least partially external to the furnace.

5. The burner according to claim 4, wherein said at least one passageway is in fluid communication with a plurality of burners in the furnace.

6. The burner according to claim 1, wherein said means for increasing the inspirating effect of uncombusted fuel gas exiting said fuel spud is a smoothly profiled outer surface of said fuel spud, said outer surface capable of reducing flow separation and flow eddies as air and flue gas pass over said fuel spud into said upstream end of said burner tube.

7. The burner according to claim 6, wherein said means for increasing the inspirating effect of uncombusted fuel gas exiting said fuel spud further includes a converging/diverging Laval nozzle formed within said fuel spud.

8. The burner according to claim 1, wherein said means for increasing the inspirating effect of uncombusted fuel gas exiting said fuel spud is a converging/diverging Laval nozzle formed within said fuel spud.

9. The burner according to claim 8, the burner further comprising a fuel supply control system, said fuel supply control system including a heater for heating the fuel gas prior to entering the burner to a temperature effective to maximize the velocity of the fuel gas exiting the Laval nozzle of said fuel spud.

10. The burner according to claim 9, wherein the quantity of fuel gas delivered to the burner by said fuel supply control system is controlled by a flow controller.

11. The burner according to claim 7, the burner further comprising a fuel supply control system, said fuel supply control system including a heater for heating the fuel gas prior to entering the burner to a temperature effective to maximize the velocity of the fuel gas exiting the Laval nozzle of said fuel spud.

12. The burner according to claim 11, wherein the quantity of fuel gas delivered to the burner by said fuel supply control system is controlled by a flow controller.

13. The burner according to claim 12, wherein the burner is a pre-mix burner.

14. The burner of claim 1, further comprising at least one steam injection tube for injecting steam upstream of said burner tube.

15. A method for combusting fuel in a burner of a furnace, comprising the steps of:
(a) combining fuel gas and air, flue gas or mixtures thereof at a predetermined location adjacent a fuel spud;
(b) discharging the fuel gas and air, flue gas or mixtures thereof at a burner tip downstream of the predetermined location, the burner tip peripherally surrounded by a tile;
(c) drawing a stream of flue gas from the furnace in response to the inspirating effect of uncombusted fuel gas exiting said fuel spud;
(d) increasing the inspirating effect of uncombusted fuel gas exiting said fuel spud; and
(e) combusting said fuel gas downstream of the burner tip downstream of said predetermined location,
wherein said inspirating increasing step is effective to increase the amount of flue gas drawn from the furnace as compared to a burner without said means for increasing the inspirating effect.

16. The method according to claim 15, further comprising the step of mixing air having a temperature lower than the temperature of the flue gas with the stream of flue gas and drawing the mixture of the lower temperature air and flue gas, to said predetermined location, to thereby lower the temperature of the drawn flue gas.

17. The method according to claim 16, wherein said drawing step includes passing the fuel gas and air, flue gas or mixtures thereof through a venturi, whereby the inspirating effect of the uncombusted fuel gas exiting the fuel spud and flowing through said venturi draws the flue gas and lower temperature air into the venturi.

18. The method according to claim 17, wherein said inspirating increasing step is accomplished through the use of a smoothly profiled fuel spud outer surface, and the method further comprises reducing flow separation and flow eddies as air, flue gas or mixtures thereof pass over the fuel spud.

19. The method according to claim 15, wherein said inspirating increasing step is accomplished through the use of a smoothly profiled fuel spud outer surface, and the method further comprises reducing flow separation and flow eddies as air, flue gas or mixtures thereof pass over the fuel spud.

20. The method according to claim 19, wherein said inspirating increasing step further employs a converging/diverging Laval nozzle formed within the fuel spud and the method further comprises maximizing the velocity of the fuel gas exiting the Laval nozzle of the fuel spud.

21. The method according to claim 15, wherein said inspirating increasing step employs a converging/diverging Laval nozzle formed within the fuel spud and the method further comprises maximizing the velocity of the fuel gas exiting the Laval nozzle of the fuel spud.

22. The method according to claim 21, further comprising the step of heating the fuel gas prior to entering the burner to a temperature effective to maximize the velocity of the fuel gas exiting the Laval nozzle of the fuel spud.

23. The method according to claim 20, further comprising the step of heating the fuel gas prior to entering the burner to a temperature effective to maximize the velocity of the fuel gas exiting the Laval nozzle of the fuel spud.

24. The method according to claim 15, wherein the burner is a pre-mix burner.

25. The method according to claim 19, wherein the burner is a pre-mix burner.

26. The method according to claim 19, wherein the furnace is a steam-cracking furnace.

27. The method according to claim 23, wherein the burner is a pre-mix burner.

28. The method according to claim 27, wherein the furnace is a steam-cracking furnace.

29. The method according to claim 15, wherein the burner is a flat-flame burner.

30. The method according to claim 23, wherein the burner is a flat-flame burner.

31. The method according to claim 30, wherein the furnace is a steam-cracking furnace.

32. The method according to claim 19, wherein the burner is a flat-flame burner.

33. The method according to claim 15, wherein said step of drawing a stream of flue gas comprises drawing a stream of flue gas through an external fuel gas recirculation duct.

34. The method of claim 15, further comprising the step of injecting steam upstream of the burner tube.

* * * * *